US007329452B2

(12) United States Patent
Clarke et al.

(10) Patent No.: US 7,329,452 B2
(45) Date of Patent: Feb. 12, 2008

(54) GAS-PERMEABLE MEMBRANE

(75) Inventors: Raymond Clarke, Los Altos, CA (US);
Charles B. Derringer, Morgan Hill, CA (US)

(73) Assignee: Apio, Inc., Guadalupe, CA (US)

( * ) Notice: Subject to any disclaimer, the term of this patent is extended or adjusted under 35 U.S.C. 154(b) by 198 days.

(21) Appl. No.: 10/742,548

(22) Filed: Dec. 19, 2003

(65) Prior Publication Data

US 2004/0131810 A1    Jul. 8, 2004

Related U.S. Application Data

(60) Provisional application No. 60/435,567, filed on Dec. 20, 2002.

(51) Int. Cl.
*C08J 9/36* (2006.01)
*B65D 81/24* (2006.01)

(52) U.S. Cl. .................. 428/137; 428/35.7; 428/138

(58) Field of Classification Search ................ 428/131, 428/137, 138, 35.7
See application file for complete search history.

(56) References Cited

U.S. PATENT DOCUMENTS

| 5,160,768 | A | 11/1992 | Antoon | 428/35.2 |
|---|---|---|---|---|
| 5,254,354 | A | 10/1993 | Stewart | 426/106 |
| 5,807,630 | A | 9/1998 | Christie et al. | 428/323 |
| 5,861,208 | A * | 1/1999 | Schreck | 428/327 |
| 6,579,607 | B1 | 6/2003 | Gozukara et al. | 428/323 |
| 2003/0099832 | A1 | 5/2003 | Borchardt | 428/402 |

FOREIGN PATENT DOCUMENTS

| WO | WO 96/38495 | 12/1996 |
|---|---|---|
| WO | WO 99/12825 | 3/1999 |

* cited by examiner

*Primary Examiner*—Alicia Chevalier
(74) *Attorney, Agent, or Firm*—Jeffrey G. Sheldon; Sheldon Mak Rose & Anderson PC

(57) ABSTRACT

Gas-permeable membranes comprising a microporous film and a coating on the microporous film, the coating being obtained by coating the microporous film with a liquid coating composition comprising a polymer and hollow polymeric particles dispersed in the composition, and then solidifying the coating. The gas-permeable membrane has a reduced ratio of carbon dioxide permeability to oxygen permeability.

18 Claims, 1 Drawing Sheet

FIGURE
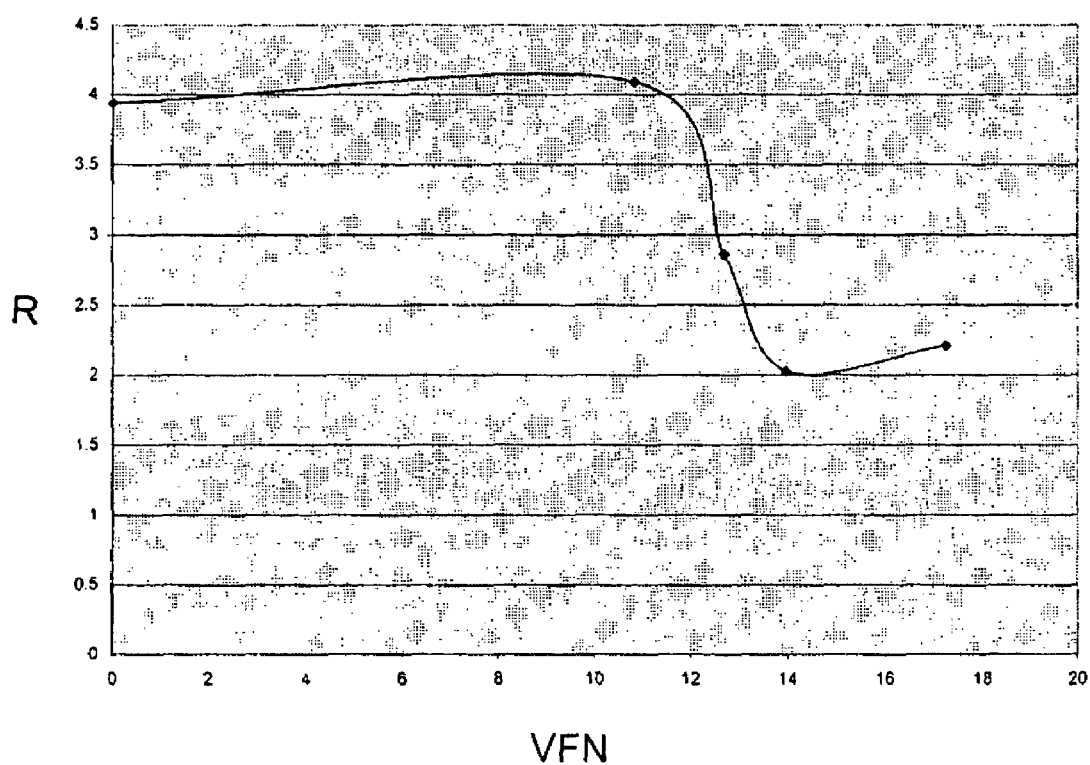

GAS-PERMEABLE MEMBRANE

CROSS REFERENCE TO RELATED APPLICATION

This application claims the benefit under 35 USC 119 (e)(1) of U.S. provisional patent application No. 60/435,567, filed by Raymond Clarke and Charles B. Derringer on 20 Dec. 2002.

BACKGROUND

The invention relates to gas-permeable membranes suitable for use in the packaging of respiring biological materials.

Respiring biological materials, e.g. fruits and vegetables, consume oxygen ($O_2$) and produce carbon dioxide ($CO_2$) at rates which depend upon the stage of their development, the atmosphere surrounding them and the temperature. In modified atmosphere packaging (MAP), the objective is to produce a desired atmosphere around respiring materials by placing them in a sealed container whose permeability to $O_2$ and $CO_2$ is correlated with (i) the partial pressures of $O_2$ and $CO_2$ in the air outside the package, and (ii) the temperature, to produce a desired atmosphere within the container. In many cases, the container includes an atmosphere control member (ACM) having a high $O_2$ transmission rate (OTR) and $CO_2$ transmission rate (COTR). In controlled atmosphere packaging (CAP), the objective is to produce a desired atmosphere around respiring materials by displacing some or all of the air within a container by one or more gases, e.g. nitrogen, $O_2$, $CO_2$ and ethylene, in desired proportions. For further details of MAP and CAP, reference may be made, for example, to U.S. Pat. No. 3,360,380 (Bedrosian), U.S. Pat. No. 3,450,542 (Badran), U.S. Pat. No. 3,450,544 (Badran et al.), U.S. Pat. No. 3,798,333 (Cummin et al), U.S. Pat. No. 3,924,010 (Erb), U.S. Pat. No. 4,003,728 (Rath), U.S. Pat. No. 4,734,324 (Hill), U.S. Pat. No. 4,779,524 (Wade), U.S. Pat. No. 4,830,863 (Jones), U.S. Pat. No. 4,842,875 (Anderson), U.S. Pat. No. 4,879,078 (Antoon), U.S. Pat. No. 4,910,032 (Antoon), U.S. Pat. No. 4,923,703 (Antoon), U.S. Pat. No. 4,987,745 (Harris), U.S. Pat. No. 5,041,290 (Wallace et al.) U.S. Pat. No. 5,045,331 (Antoon), U.S. Pat. No. 5,063,753 (Woodruff), U.S. Pat. No. 5,160,768 (Antoon), U.S. Pat. No. 5,254,354 (Stewart), U.S. Pat. No. 5,333,394 (Herdeman), U.S. Pat. No. 5,433,335 (Raudalus et al.), U.S. Pat. No. 5,460,841 (Herdeman), U.S. Pat. No. 5,556,658 (Raudalus et al.), U.S. Pat. No. 5,658,607 (Herdeman), U.S. Pat. No. 5,807,630 (Christie et al.), U.S. Pat. No. 6,013,293 (De Moor), U.S. Pat. No. 6,376,032 (Clarke et al.), U.S. Pat. No. 6,548,132 (Clarke et al.), and U.S. Pat. No. 6,579,607 (Gozukara et al.), copending commonly assigned U.S. patent application Ser. No. 09/858,190 (Publication Number US2002/0090425) and Ser. No. 09/989,682 (Publication Number US2002/0127305), Publication Number US2003/0099832, published 29 May, 2003, International Publication Nos. WO 94/12040 (Fresh Western), WO 96/38495 (Landec), WO 99/33658 (Gozukara et al.), WO 00/04787 (Landec) and WO 01/92118 (Landec), and European Patent Applications Nos. 0,351,115 and 0,351,116 (Courtaulds). The disclosure of each of those patents, applications and publications is incorporated herein by reference for all purposes.

The preferred packaging atmosphere for a respiring material often depends on the material and the changes (if any) in the material which are desired. In some cases, it is desirable for the packaging atmosphere to have a relatively high $CO_2$ content and a relatively low $O_2$ content. In order to obtain such a packaging atmosphere in a modified atmosphere package, it is desirable to make use of an ACM which has a relatively low COTR/OTR ratio (often referred to herein as the R ratio).

U.S. Pat. No. 5,807,630 (Christie et al.), U.S. Pat. No. 6,579,607 (Gozukara et al.) and Publication Number US 2003/0099832 (Borchardt), published May 29, 2003, disclose self-supporting films of controlled permeability which comprise a film-forming polymer and a porous filler. The filler has a particle size greater than the intrinsic film thickness of the film-forming polymer, and is present in amount sufficient to reduce the R ratio of the film.

SUMMARY OF THE INVENTION

We have discovered that novel and useful gas-permeable membranes, suitable for use as ACM's in packaging respiring materials, can be obtained by coating a microporous polymeric film with a liquid coating composition comprising
  (a) a polymer, and
  (b) hollow polymeric particles dispersed in the composition.

The presence of the hollow polymeric particles in the liquid coating composition results in a membrane having a reduced R ratio.

In a first aspect, this invention provides a method of preparing a gas-permeable membrane which comprises a microporous film and a solid coating on the microporous film, the method comprising
  (A) forming a liquid coating on the microporous film, the liquid coating being composed of liquid coating composition which comprises
    (a) a first polymer, and
    (b) hollow particles which (i) are dispersed in the coating composition, and (ii) are composed of a polymeric composition comprising a second polymer, the second polymer being different from the first polymer; and
  (B) solidifying the liquid coating on the microporous film.

In a second aspect, this invention provides a gas-permeable membrane which comprises
  (1) a microporous film, and
  (2) a solid coating on the microporous film, the coating comprising
    (a) a matrix comprising a first polymer, and
    (b) hollow particles which (i)) are composed of a polymeric composition comprising a second polymer, (ii) are dispersed in the matrix, and (iii) have a maximum dimension which is at most 50% of the thickness of the solid coating, the second polymer being different from the first polymer.

In a third aspect, this invention provides a gas-permeable membrane which comprises
  (1) a microporous film, and
  (2) a solid coating on the microporous film, the coating comprising
    (a) a matrix comprising a first polymer, and
    (b) a plurality of microscopic voids which
      (i) provide continuous pathways for the transmission of oxygen and carbon dioxide through the coating, and
      (ii) are at least partly defined by walls composed of the second polymer.

The gas-permeable membranes of the second and third aspects of the invention can be prepared by the method of the first aspect of the invention. The membranes of the third aspect of the invention are obtained when the solidification step (B) involves heating which at least partially melts at least some of the hollow polymeric particles so that they fuse together to form a plurality of microscopic voids. Thus, it is possible for the solid coating of the membranes of the second and third aspect of the invention to include both (i) hollow polymeric particles which are the same as or similar to the hollow polymeric particles in the coating composition and (ii) microscopic voids formed by fusion of hollow polymeric particles.

In a fourth aspect, this invention provides a container which can be sealed around a respiring biological material and which includes one or more ACM's, at least one of the ACM's comprising a gas-permeable membrane prepared by the method of the first aspect of the invention and/or as defined in the second and/or third aspect of the invention. Generally, the container is such that, after the container has been sealed around the biological material, at least 50%, often at least 75%, of the oxygen which enters the interior of the sealed package passes through the one or more ACM's.

In a fourth aspect, this invention provides a package which comprises (a) a sealed container, and (b) within the sealed container, a respiring biological material and a packaging atmosphere around the biological material;

the sealed container including one or more ACM's, at least one of said ACM's comprising a gas-permeable membrane prepared by the method of the first aspect of the invention and/or as defined in the second and/or third aspect of the invention. Generally, the package is such that at least 50%, often at least 75%, of the oxygen which enters the packaging atmosphere passes through the one or more atmosphere control members.

BRIEF DESCRIPTION OF THE DRAWINGS

The invention is illustrated in the accompanying drawing, in which the FIGURE is a graph of R ratio (R) against volume fraction of particles (VFN) in Examples 1-4 below.

DETAILED DESCRIPTION OF THE INVENTION

In the Summary of the Invention above and in the Detailed Description of the Invention, the Examples, and the Statements below, reference is made to particular features (including method steps) of the invention. It is to be understood that the disclosure of the invention in this specification includes all appropriate combinations of such particular features. For example, where a particular feature is disclosed in the context of a particular aspect or embodiment of the invention, or a particular Statement or claim, that feature can also be used, to the extent appropriate, in combination with and/or in the context of other particular aspects and embodiments of the invention, and in the invention generally.

In describing and claiming the invention below, the following abbreviations, definitions, and methods of measurement (in addition to those already given) are used.

OTR is $O_2$ permeability. COTR is $CO_2$ permeability. OTR and COTR values are given in cc/100 inch$^2$.atm.24 hrs, and can be measured using a permeability cell (supplied by Millipore) in which a mixture of $O_2$, $CO_2$ and helium is applied to the sample, using a pressure of 0.035 kg/cm$^2$ (0.5 psi), and the gases passing through the sample are analyzed for $O_2$ and $CO_2$ by a gas chromatograph. The cell could be placed in a water bath to control the temperature. The abbreviation $P_{10}$ is used to mean the ratio of the permeability, to $O_2$ or $CO_2$ as specified, at a first temperature $T_1°$ C. to the permeability at a second temperature $T_2$, where $T_2$ is $(T_1-10)°$ C. $T_1$ being 10° C. and $T_2$ being 0° C. unless otherwise noted. The abbreviation R or R ratio is used to mean the ratio of COTR to OTR, both permeabilities being measured at 20° C. unless otherwise noted. Pore sizes are measured by mercury porosimetry. Parts and percentages are by weight, except for percentages of gases, which are by volume. Temperatures are in degrees Centigrade. For crystalline polymers, the abbreviation $T_o$ is used to mean the onset of melting, the abbreviation $T_p$ is used to mean the crystalline melting point, and the abbreviation ΔH is used to mean the heat of fusion. $T_o$, $T_p$ and ΔH are measured by means of a differential scanning calorimeter (DSC) at a rate of 10° C./minute and on the second heating cycle. $T_o$ and $T_p$ are measured in the conventional way well known to those skilled in the art. Thus $T_p$ is the temperature at the peak of the DSC curve, and $T_o$ is the temperature at the intersection of the baseline of the DSC peak and the onset line, the onset line being defined as the tangent to the steepest part of the DSC curve below $T_p$.

The term "comprises" and grammatical equivalents thereof are used herein to mean that other elements (i.e. components, ingredients, steps etc.) are optionally present. For example, a composition "comprising" (or "which comprises") ingredients A, B and C can contain only ingredients A, B and C, or can contain not only ingredients A, B and C but also one or more other ingredients. The term "consisting essentially of" and grammatical equivalents thereof are used herein to mean that other elements may be present which do not materially alter the claimed invention. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example, "from 8 to 20 carbon atoms" or "8-20 carbon atoms" means a range whose lower limit is 8 carbon atoms, and whose upper limit is 20 carbon atoms. The numbers given herein should be construed with the latitude appropriate to their context and expression.

Where reference is made herein to sealed packages and sealed containers, and to sealing bags and other containers containing biological materials, it is to be understood that the sealing can be, but need not be, hermetic sealing. Conventional methods for sealing bags and other containers can conveniently be used in this invention. If the bag is sealed hermetically, it will generally be desirable to include one or more pinholes in the bag, to achieve equilibration of the pressures inside and outside the bag.

The method of the first aspect of the invention may optionally have one or more of the following features:
(i) the hollow polymeric particles have one or more of the following characteristics
  (a) a maximum dimension D of most 0.5 t, for example 0.1 t to 0.4 t, where t is the thickness of the solid coating;
  (b) an average size of 0.2 to 0.8 micron, for example 0.4 to 0.7 micron; and
  (c) at least 90% of the particles have a maximum dimension of 0.2 to 0.8 micron, for example 0.4 to 0.7 micron;
(ii) the hollow particles dispersed in the liquid coating composition are such that, at at least one temperature between 0 and 22° C., the gas-permeable membrane prepared by the method has an R ratio which is at most 0.85 times, preferably at most 0.75 times, the R ratio of a gas-permeable membrane which is produced by a method which is identical except that the liquid coating composition does not contain the particles;
(iii) the hollow particles are hollow microspheres or hollow microfilaments composed of a homopolymer or copolymer of styrene, e.g. a copolymer of styrene and at least one acrylic monomer;
(iv) the average size of the hollow particles dispersed in the coating composition is 0.2 to 0.8 micron, for example 0.4 to 0.7 micron;
(v) at least 90% of the hollow particles dispersed in the coating composition have a maximum dimension of 0.2 to 0.8 micron, for example 0.4 to 0.7 micron;
(vi) the coating composition contains 5 to 50%, preferably 10 to 40%, for example 20 to 35%, by weight of the hollow particles, based on the combined weight of the polymer and the particles;
(vii) the volume of the hollow particles dispersed in the liquid coating composition is
  (a) at least 11%, preferably at least 12%, for example at least 13%, of the volume of the solid coating, and/or
  (b) less than 30%, for example less than 20%, of the volume of the solid coating, and/or
  (c) 11 to 20%, preferably 12 to 18%, of the volume of the solid coating;
(viii) the polymer comprises a crystalline polymer
  (a) having a peak melting temperature $T_p$ of −5 to 40° C., for example 0 to 25° C., and a heat of fusion of at least 5 J/g, preferably least 10 J/g, especially at least 20 J/g, and/or
  (b) having an onset of melting temperature $T_o$ such that $(T_p-T_o)$ is less than 10° C., preferably less than 8° C., for example 5-10° C., and/or
  (c) comprising at least one side chain crystalline (SCC) polymer, for example an SCC polymer which contains ethylenically unsaturated repeating units;
(ix) the polymer is an amorphous polymer, e.g. a polysiloxane;
(x) the polymer becomes crosslinked during the step (B);
(xi) the coating composition comprises a liquid carrier, for example an aqueous liquid (including water) having the polymer and the hollow particles uniformly dispersed therein, preferably a mixture of an aqueous emulsion of the polymer and an aqueous emulsion of the hollow particles; and
(xii) step (B) comprises heating the coating, for example to remove a liquid carrier therefrom and/or to crosslink the polymeric matrix and/or to cause the hollow particles to fuse to each other and/or to the polymeric matrix; the heating can be carried out as a separate step or as part of a continuous operation; the coating can for example be heated at a temperature of 50 to 85° C.

Membranes prepared by the method of the first aspect of the invention may optionally have one or more of the following characteristics
  (a) an OTR at 20° C. of at least 30,000, preferably at least 50,000, cc/100 in$^2$.atm.24 hrs;
  (b) an oxygen $P_{10}$ ratio of at least 2, preferably at least 2.5, over at least one 10° C. temperature range between 0 and 25° C.;
  (c) a carbon dioxide $P_{10}$ ratio of at least 2, preferably at least 2.5, over at least one 10° C. temperature range between 0 and 25° C.; and
  (d) an R ratio of less than 4, preferably less than 3, particular less than 2.5, at at least one temperature between 0 and 22° C.

If higher OTR and COTR values are desired, the coating weight of the coating composition can be reduced, but this will result in lower $P_{10}$ values.

The gas-permeable membranes of the second and third aspects of the invention may optionally have one or more of the following characteristics:
(i) the solid polymeric coating comprises microscopic voids and/or hollow polymeric particles such that, at at least one temperature between 0 and 22° C., the membrane has an R ratio which is at most 0.85 times, preferably at most 0.75 times, the R ratio of a membrane which is the same except that the coating does not contain the microscopic voids and/or hollow polymeric particles;
(ii) the hollow polymeric particles have one or more of the following characteristics
  (a) a maximum dimension D of most 0.5 t, for example 0.1 t to 0.4 t, where t is the thickness of the solid coating;
  (b) an average size of 0.2 to 0.8 micron, for example 0.4 to 0.7 micron; and
  (c) at least 90% of the particles have a maximum dimension of 0.2 to 0.8;
(iii) the solid coating contains 5 to 50%, preferably 10 to 40%, for example 20 to 35%, by weight of the second polymer;
(iv) the hollow polymeric particles and/or the microscopic voids resulting from fusion of hollow polymeric particles define volumes which constitute
  (a) at least 11%, preferably at least 12%, for example at least 13%, of the volume of the solid coating, and/or
  (b) less than 30%, for example less than 20%, of the volume of the solid coating, and/or
  (c) 11 to 20%, preferably 12 to 18%, of the volume of the solid coating;
(v) the polymeric matrix comprises a crystalline polymer as defined in subparagraph (vii) above;
(vi) the polymeric matrix is crosslinked;
(vii) the membrane has at least one of the following characteristics
  (a) an OTR at 20° C. of at least 30,000, preferably at least 50,000, cc/100 in$^2$.atm.24 hrs;
  (b) an oxygen $P_{10}$ ratio of at least 2, preferably at least 2.5, over at least one 10° C. temperature range between 0 and 25° C.;

(c) a carbon dioxide $P_{10}$ ratio of at least 2, preferably at least 2.5, over at least one 10° C. temperature range between 0 and 25° C.; and (d) an R ratio of less than 4, preferably less than 3, particular less than 2.5, at at least one temperature between 0 and 22° C.

The microporous polymeric film, which serves as a support for the polymeric coating, comprises a network of interconnected pores such that gases can pass through the film. Preferably the pores have an average pore size of less than 0.24 micron. Other optional features of the microporous film include (a) at least 70%, e.g. at least 90%, of the pores having a pore size of less than 0.24 micron;

(b) at least 80% of the pores have a pore size less than 0.15 micron;

(c) less than 20% of the pores have a pore size less than 0.014 micron;

(d) the pores constitute 35 to 80% by volume of the microporous film;

(e) the microporous film comprises a polymeric matrix comprising (i) an essentially linear ultrahigh molecular weight polyethylene having an intrinsic viscosity of at least 18 deciliters/g, or (ii) an essentially linear ultra-high molecular weight polypropylene having an intrinsic viscosity of at least 6 deciliters/g, or (iii) a mixture of (i) and (ii);

(f) the microporous film contains 30 to 90% by weight, based on the weight of the film, of a finely divided particulate substantially insoluble filler, preferably a siliceous filler, which is distributed throughout the film;

(g) the microporous film is prepared by a process comprising (A) preparing a uniform mixture comprising the polymeric matrix material in the form of a powder, the filler, and a processing oil;

(B) extruding the mixture as a continuous sheet;

(C) forwarding the continuous sheet, without drawing, to a pair of heated calender rolls;

(D) passing the continuous sheet through the calender rolls to form a sheet of lesser thickness;

(E) passing the sheet from step (D) to a first extraction zone in which the processing oil is substantially removed by extraction with an organic extraction liquid which is a good solvent for the processing oil, a poor solvent for the polymeric matrix material, and more volatile than the processing oil;

(F) passing the sheet from step (E) to a second extraction zone in which the organic extraction liquid is substantially removed by steam or water or both; and (G) passing the sheet from step (F) through a forced air dryer to remove a residual water and organic extraction liquid.

As indicated above, the polymeric matrix of the coating on the microporous film preferably comprises, and may consist essentially of, a crystalline polymer, preferably an SCC polymer. The use of a crystalline polymer results in an increase in the $P_{10}$ values in the melting region of the polymer. The SCC polymer can comprise, and optionally can consist of, units derived from (i) at least one n-alkyl acrylate or methacrylate (or equivalent monomer, for example an amide) in which the n-alkyl group contains at least 12 carbon atoms, for example in amount 35-100%, preferably 50-100%, often 80-100%, and optionally (ii) one or more comonomers selected from acrylic acid, methacrylic acid, and esters of acrylic or methacrylic acid in which the esterifying group contains less than 10 carbon atoms. The SCC polymer can also include units derived from a diacrylate or other crosslinking monomer. The preferred number of carbon atoms in the alkyl group of the units derived from (i) depends upon the desired melting point of the polymer. For the packaging of biological materials, it is often preferred to use a polymer having a relatively low melting point, for example a polymer in which the alkyl groups in the units derived from (i) contain 12 and/or 14 carbon atoms. The SCC polymer can be a block copolymer in which one of blocks is a crystalline polymer as defined and the other block(s) is crystalline or amorphous, for example a block copolymer comprising (i) polysiloxane polymeric blocks, and (ii) crystalline polymeric blocks having a $T_p$ of −5 to 40° C. Preferred SCC polymers are those prepared by emulsion polymerization, particularly those prepared in accordance with the disclosure of U.S. Pat. No. 6,199,318 (Stewart et al) and U.S. Pat. No. 6,540,984 (Stewart et al.), the entire disclosures of which are incorporated herein by reference.

The polymeric matrix can also consist of or contain other crystalline and amorphous polymers. Examples of such other polymers include cis-polybutadiene, poly (4-methylpentene), polysiloxanes including polydimethyl siloxane, and ethylene-propylene rubber.

The preferred hollow polymeric particles for use in this invention are hollow microspheres of an organic polymer. Such microspheres can be consist essentially of, for example, homopolymers of styrene; copolymers of styrene and one or more other monomers, for example styrene acrylic copolymers, styrene divinylbenzene copolymers, styrene maleic anhydride copolymers, and styrene butadiene copolymers; polyvinyl toluene; and polymethyl methacrylate. Such particles are commercially available in a wide range of sizes as opacifiers for paints and for use in cytometry. For example, acrylic/styrene copolymers are available under the tradename Ropaque from Rohm & Haas; polystyrene and carboxyl microspheres are available under the tradename Polybead from Polysciences Inc.; and polystyrene and styrene copolymer microspheres are available from Bangs Laboratories Inc. For use in this invention, the particles of preferably in the form of an aqueous emulsion that blends easily with an aqueous emulsion of the matrix polymer to be coated onto the microporous film.

The permeability of the containers and packages of the invention can be influenced by perforating the container in order to make a plurality of pinholes therein.

EXAMPLES

The invention is illustrated in the following Examples, Examples C1-C4 being comparative Examples. In the Examples, the SCC1, SCC2 and SCC3 acrylate polymers used to provide the polymeric matrix in the coatings were prepared by emulsion polymerizing the monomers and parts by weight thereof shown in Table 1 to give emulsion polymers having the % solids, particle sizes, $T_p$ and $\Delta H$ also shown in Table 1. In Table 1, MAA is methacrylic acid, C6DA is hexyldiacrylate, C12A is dodecyl acrylate, and C14A is tetradecyl acrylate.

TABLE 1

|  | MAA | C6DA | C12A | C14A | % solids | particle size (nm) | $T_p$ °C. | $\Delta H$ J/g |
|---|---|---|---|---|---|---|---|---|
| SCC1 | 3.96 | 1.0 | 11.5 | 83.6 | 30.5 | 110 | 16.85 | |
| SCC2 | 4.0 | 0.7 | 38.2 | 57.2 | 48.1 | 165 | 10.16 | 35.8 |
| SCC3 | 4.0 | 0.7 | 0 | 95.4 | 47.2 | 123 | 19.6 | 44.8 |

OP96 is an aqueous emulsion containing about 36.6% or about 47.2% by weight of hollow polymer spheres having an average particle size of 550 nm. It is available from Rohm & Haas under the tradename Ropaque OP96. Teslin is a microporous polyethylene film available commercially from PPG under the tradename Teslin SP7. It contains about 60% silica, has a thickness of about 0.18 mm (0.007 inch), a porosity of about 65%, an average pore size of about 0.1 micron and a largest pore size of 4-10 microns. The distribution of pore sizes in Teslin SP7 is set out in Table 2 below.

TABLE 2

| Pore Size (microns) | .013 | .016 | .026 | .044 | .058 | .08 | .11 | .15 | .24 | .36 | .6 |
|---|---|---|---|---|---|---|---|---|---|---|---|
| % of pores larger than pore size | 90 | 80 | 70 | 60 | 50 | 40 | 30 | 20 | 10 | 5 | 2 |

In each of the Examples, the coating composition was coated onto Teslin using a #10 wire-wound rod, and was then dried at 82° C. for 2 hours, resulting in a crosslinked coating on the surface of the Teslin. The OTR and COTR of the resulting product were measured at different temperatures.

Examples C1 and 1-4

Examples C1 and 1-4 are summarized in Table 3 below. In each of these Examples, the coating composition (cc) was prepared by mixing polymer SCC1 and the indicated percentage by weight (based on the weight of the mixture) of OP96 (36.6% solids), followed by dilution to about 3% solids in Examples 1-4 and to about 7% solids in Example C1. The dried coating (dc) containing the indicated percentages by weight and by volume of the hollow polymeric spheres.

TABLE 3

| | Wt % | Wt % | vol % | Temperature | | | | | | |
|---|---|---|---|---|---|---|---|---|---|---|
| | | | | 22° C. | | 10° C. | | 0° C. | | $P_{10}$ |
| Ex # | OP96 in cc | spheres in dc | spheres in dc | OTR | R | OTR | R | OTR | R | ($O_2$) |
| C1 | 0 | 0 | 0 | 45.1 | 5.21 | 12.2 | 4.99 | 6.4 | 2.21 | 1.90 |
| 1 | 20 | 23.1 | 10.8 | 55.8 | 5.16 | 16.9 | 4.06 | 9.7 | 2.03 | 1.74 |
| 2 | 23 | 26.4 | 12.7 | 42.8 | 4.94 | 16.0 | 4.20 | 9.8 | 2.86 | 1.64 |
| 3 | 25 | 28.6 | 13.9 | 51.0 | 4.27 | 26.1 | 3.14 | 20.7 | 4.09 | 1.32 |
| 4 | 30 | 34 | 17.2 | 48.0 | 4.30 | 23.7 | 3.36 | 18.0 | 3.94 | 1.28 |

Examples C2 and 5

Examples C2 and 5 are summarized in Table 4 below. In each of these Examples, the coating composition (cc) was prepared by mixing polymer SCC2 and the indicated percentage by weight (based on weight of the mixture) of OP96 (55% solids), followed by dilution to about 5% solids in Example C2 and about 12% solids in Example 5. The dried coating (dc) containing the indicated percentages by weight and by volume of hollow polymeric particles.

TABLE 4

| | wt % | wt % | vol % | Temperature | | | | | | $P_{10}$ | $P_{10}$ |
|---|---|---|---|---|---|---|---|---|---|---|---|
| | | | | 22° C. | | 10° C. | | 0° C. | | $O_2$ | $CO_2$ |
| Ex # | OP96 in cc | spheres in dc | spheres in dc | OTR | R | OTR | R | OTR | R | 0-10° C. | 0-10° C. |
| C2 | 0 | 0 | 0 | 71 | 4.96 | 46.3 | 5.41 | 14.0 | 3.86 | 3.31 | 4.69 |
| 5 | 24 | 19.4 | 13.3 | 85.1 | 3.88 | 61.9 | 3.84 | 34.5 | 2.18 | 1.81 | 3.17 |

Examples C3, C4 and 6

Examples C3, C4 and 6 are summarized in Table 5 below. In Example C3, the coating composition (cc) contained only polymer SCC3 and was coated at 11% solids. In Example C4, the coating composition contained a 50/50 mixture of polymers SCC2 and SCC3, and was coated at 10% solids. In Example 6, the coating composition was made by mixing 76% of a 50/50 mixture of polymers SCC2 and SCC3, and 24% of OP96 (36.6%) followed by dilution to about 12% solids. The dried coating (dc) contain the indicated percentages by weight and by volume of hollow polymeric spheres.

TABLE 6

| Ex # | at 10° C. after 120 hours | | at 2° C. after 144 hours | | wt loss after 240 hours |
|---|---|---|---|---|---|
| | $O_2$ | $CO_2$ | $O_2$ | $CO_2$ | |
| C5 | — | — | — | — | 21.8 |
| C6 | 3.9 | 5.5 | 7.3 | 3.4 | 0.3 |
| 7 | 5.0 | 8.9 | 7.5 | 8.4 | 0.16 |
| 8 | 8.9 | 6.4 | 11.2 | 6.1 | 0.21 |

TABLE 5

| | Wt % | wt % | vol % | Temperature | | | | | | | |
|---|---|---|---|---|---|---|---|---|---|---|---|
| | | | | 25° C. | | 20° C. | | 15° C. | | 10° C. | |
| Ex # | OP96 in cc | spheres in dc | spheres in dc | OTR | R | OTR | R | OTR | R | OTR | R |
| C3 | 0 | 0 | 0 | 79.3 | 4.64 | 70.8 | 4.79 | 31.3 | 4.49 | 19.3 | 2.86 |
| C4 | 0 | 0 | 0 | 125 | 3.82 | 111 | 3.86 | 80.4 | 3.66 | 58.1 | 3.03 |
| 6 | 24 | 19.5 | 13.3 | 107 | 3.22 | 101 | 3.19 | 75.7 | 2.79 | 62.4 | 2.58 |

| | Wt % | Wt % | vol % | Temperature | | | |
|---|---|---|---|---|---|---|---|
| | | | | 5° C. | | 0° C. | |
| Ex # | OP96 in cc | spheres in dc | spheres in dc | OTR | R | OTR | R |
| C3 | 0 | 0 | 0 | 16.7 | 2.34 | 14.4 | 1.88 |
| C4 | 0 | 0 | 0 | 42.3 | 2.2 | 38.4 | 1.61 |
| 6 | 24 | 19.5 | 13.3 | 52.7 | 1.76 | 47.6 | 1.39 |

| | Wt % | wt % | vol % | $P_{10}(O_2)$ | | | | $P_{10}(CO_2)$ | | | |
|---|---|---|---|---|---|---|---|---|---|---|---|
| Ex # | OP96 in cc | spheres in dc | spheres in dc | 15-25° C. | 10-20° C. | 5-15° C. | 0-10° C. | 15-25° C. | 10-20° C. | 5-15° C. | 0-10° C. |
| C3 | 0 | 0 | 0 | 2.58 | 3.71 | 1.89 | 1.36 | 2.66 | 6.14 | 3.6 | 2.05 |
| C4 | 0 | 0 | 0 | 1.55 | 1.92 | 1.78 | 1.51 | 2.62 | 2.45 | 2.95 | 2.85 |
| 6 | 24 | 19.5 | 13.3 | 1.41 | 1.61 | 1.44 | 1.31 | 1.63 | 2.00 | 2.28 | 2.44 |

Examples C5, C6, 7 and 8

In Examples C5, C6, 7 and 8, packages containing 3 lb (2.25 kg) of whole strawberries were used. In Example C5, the package was open. In Example C6, the package was sealed and was composed of Mylar except for a known atmosphere control member having an area of 2.5 inch$^2$ (1610 mm$^2$) and composed of Teslin having a coating thereon of an SCC polymer containing units derived from tetradecyl acrylate (57 parts), hexadecyl acrylate (40 parts) and acrylic acid (3 parts). In Example 7, the package was the same as in Example C6, except that the atmosphere control member was composed of the coated film of Example 5. In Example 8, the package was the same as in Example 7, except that the area of the atmosphere control member was 4.0 inch$^2$ (2580 mm$^2$). Each package in Examples C6, 7 and 8 had a 26 g pinhole to equalize the pressures inside and outside the sealed package.

The packages were stored at 2° C. for 72 hours, then at 10° C. for 48 hours, and finally at 2° C. for 120 hours, after which the sealed packages were opened. Table 6 below shows the weight loss of the strawberries at the end of the storage period and the $O_2$ and $CO_2$ contents of the atmosphere within the sealed packages at 10° C. after 120 hours (i.e. at the end of the 10° C. storage period) and at 2° C. after 144 hours.

The invention claimed is:

1. A gas-permeable membrane which comprises
   (1) a microporous film, and
   (2) a solid coating on the microporous film, the coating comprising
      (a) a matrix comprising a first polymer, and
      (b) a plurality of microscopic voids which
         (i) provide continuous pathways for the transmission of oxygen and carbon dioxide through the coating, and
         (ii) are at least partly defined by walls composed of a second polymer,
   the second polymer being different from the first polymer and the solid coating containing 10 to 40% by weight of the second polymer, based on the weight of the solid coating.

2. A membrane according to claim 1 which has an oxygen permeability (OTR) of at least 30,000 cc/100 in$^2$.atm.24 hrs at 20° C., a ratio of carbon dioxide permeability to oxygen permeability (R ratio) of less than 4 at at least one temperature between 0 and 22° C.

3. A membrane according to claim 1 wherein (i) the first polymer consists essentially of at least one side chain crystalline polymer having a peak melting temperature $T_p$ of −5 to 40° C. and a heat of fusion of at least 10 J/g, and (ii) the second polymer consists essentially of a homopolymer or copolymer of styrene.

4. A membrane according to claim 1 which
(a) has an oxygen permeability (OTR) at 20° C. of at least 30,000 cc/100 in$^2$.atm.24 oh for and concentrate on my phone hrs;
(b) has an oxygen $P_{10}$ ratio of at least 2 over at feast one 10° C. temperature range between 0 and 25° C.;
(c) has a carbon dioxide $P_{10}$ ratio of at least 2 over at least one 10° C. temperature range between 0 and 25° C., and
(d) has an R ratio less than 4 at at least one temperature between 0 and 22° C.

5. A container which can be sealed around a respiring biological material and which includes one or more atmosphere control members, at least one of the atmosphere control members comprising a gas-permeable membrane as defined in claim 1.

6. A package which comprises
(a) a sealed container, and
(c) within the sealed container, a respiring biological material and a packaging atmosphere around the biological material;
the sealed container including one or more atmosphere control members, at least one of the atmosphere control members comprising a gas-permeable membrane as defined in claim 1.

7. A membrane according to claim 1 wherein the coating comprises hallow particles which (i) are composed of a polymeric composition comprising the second polymer, (ii) are dispersed in the matrix, and (iii) have a maximum dimension which is at most 50% of the thickness of the solid coating; and the hollow polymeric particles and the microscopic voids define volumes which constitute 11 to 20% of the volume of the solid coating.

8. A membrane according to claim 7 wherein the hollow particles are hollow microspheres or hollow microfilaments composed of a homopolymer or copolymer of styrene.

9. A gas-permeable membrane which comprises
(1) a microporous film, and
(2) a solid coating on the microporous film, the coating comprising
   (a) a matrix comprising a first polymer, and
   (b) hollow particles which (i) are composed of a polymeric composition comprising a second polymer, (ii) are dispersed in the matrix, and (iii) have a maximum dimension which is at most 50% of the thickness of the solid coating, the second polymer being different from the first polymer and being present in amount 5 to 50% by weight, based on the weight of the solid coating, and
wherein
(i) the coating contains 10 to 40% by weight of the hollow particles, based on the combined weight of the first polymer and the particles, and
(ii) at least 90% of the particles have a maximum dimension of 0.2 to 0.8 micron.

10. A membrane according to claim 9 which also comprises a plurality of microscopic voids which
(i) provide continuous pathways for the transmission of oxygen and carbon dioxide through the coating, and
(ii) are at least partly defined by walls composed of the second polymer.

11. A membrane according to claim 9 which has an oxygen permeability (OTR) of at least 30,000 cc/100 in$^2$.atm,24 hrs at 20° C., and a ratio of carbon dioxide permeability to oxygen permeability (R ratio) of less than 4 at at least one temperature between 0 and 22° C.

12. A membrane according to claim 9 wherein (i) the first polymer consists essentially of at least one side chain crystalline polymer having a peak melting temperature $T_p$ of $-5$ to 40° C., and a heat of fusion of at least 10 J/g, and (ii) the second polymer consists essentially of a homopolymer or copolymer of styrene.

13. A membrane according to claim 9 which
(a) has an oxygen permeability (OTR) at 20° C. of at least 30,000 cc/100 in$^2$.atm.24 hrs;
(b) has an oxygen $P_{10}$ ratio of at least 2 over at least one 10° C. temperature range between 0 and 25° C.;
(c) has a carbon dioxide $P_{10}$ ratio of at least 2 over at least one 10° C. temperature range between 0 and 25° C.; and
(d) has a ratio of carbon dioxide permeability to oxygen permeability (R ratio) of less than 4 at at least one temperature between 0 and 22° C.

14. A container which can be sealed around a respiring biological material and which includes one or more atmosphere control members, at least one of the atmosphere control members comprising a gas-permeable membrane as defined in claim 9.

15. A package which comprises
(a) a sealed container, and
(b) within the sealed container, a respiring biological material and a packaging atmosphere around the biological material;
the sealed container including one or more atmosphere control members, at least one of the atmosphere control members comprising a gas-permeable membrane as defined in claim 9.

16. A package according to claim 15 wherein the respiring biological material is fresh berries, fresh cut fruit, or a vegetable.

17. A membrane according to claim 9 wherein the volume of the hollow particles dispersed in the coating is 11 to 20% of the volume of the solid coating.

18. A membrane according to claim 9 wherein the hollow particles are hollow microspheres or hollow microfilaments composed of a homopolymer or copolymer of styrene.

* * * * *